(12) United States Patent
Zamora et al.

(10) Patent No.: US 7,603,264 B2
(45) Date of Patent: *Oct. 13, 2009

(54) THREE-DIMENSIONAL WELLBORE VISUALIZATION SYSTEM FOR DRILLING AND COMPLETION DATA

(75) Inventors: Mario Zamora, Houston, TX (US); Douglas Simpkins, Spring, TX (US)

(73) Assignee: M-I L.L.C., Houston, TX (US)

( * ) Notice: Subject to any disclaimer, the term of this patent is extended or adjusted under 35 U.S.C. 154(b) by 545 days.

This patent is subject to a terminal disclaimer.

(21) Appl. No.: 11/083,122

(22) Filed: Mar. 16, 2005

(65) Prior Publication Data

US 2005/0216197 A1 Sep. 29, 2005

Related U.S. Application Data

(63) Continuation of application No. 11/063,913, filed on Feb. 23, 2005.

(60) Provisional application No. 60/553,486, filed on Mar. 16, 2004.

(51) Int. Cl.
G06G 7/48 (2006.01)
G01V 1/00 (2006.01)
G01V 1/40 (2006.01)

(52) U.S. Cl. .................. 703/10; 702/6; 702/18

(58) Field of Classification Search .................. 703/10; 702/6, 16, 18, 150, 152, 153
See application file for complete search history.

(56) References Cited

U.S. PATENT DOCUMENTS

| | | | |
|---|---|---|---|
| 4,973,960 A | 11/1990 | Mount | |
| 6,078,867 A * | 6/2000 | Plumb et al. | 702/6 |
| 6,106,561 A | 8/2000 | Farmer et al. | |
| 6,282,452 B1 | 8/2001 | DeGuzman et al. | |
| 6,313,837 B1 | 11/2001 | Assa et al. | |
| 6,665,117 B2 * | 12/2003 | Neff et al. | 359/451 |
| 6,826,483 B1 * | 11/2004 | Anderson et al. | 702/13 |
| 6,873,947 B1 * | 3/2005 | Huang et al. | 703/10 |
| 6,941,255 B2 * | 9/2005 | Kennon et al. | 703/10 |
| 6,997,256 B2 * | 2/2006 | Williams et al. | 166/250.03 |
| 2005/0015229 A1 * | 1/2005 | Huang | 703/10 |
| 2005/0096847 A1 * | 5/2005 | Huang | 702/9 |
| 2005/0209866 A1 * | 9/2005 | Veeningen et al. | 705/1 |
| 2006/0076163 A1 * | 4/2006 | Terracina et al. | 175/393 |

* cited by examiner

*Primary Examiner*—Paul L Rodriguez
*Assistant Examiner*—Andre Pierre Louis
(74) *Attorney, Agent, or Firm*—Wong, Cabello, Lutsch, Rutherford & Brucculeri LLP

(57) ABSTRACT

A visualization system for a wellbore environment includes a graphics processor for creating a wire mesh model of a well and optionally a drillstring based on datasets of depth-varying parameters of the well. A graphics system maps appropriate textures to the wire mesh models, which are then displayed on a graphics display. A user interface facilitates user navigation along the length of the well to any selected location therein, and further permits user adjustment of orientation of the displayed renderings. Simulated, real or a combination of simulated and real wellbore data may be visually depicted in the wellbore at any selected location. This provides the user with a visual indication of the wellbore environment as the user navigates the visualization along the length of the wellbore.

23 Claims, 15 Drawing Sheets

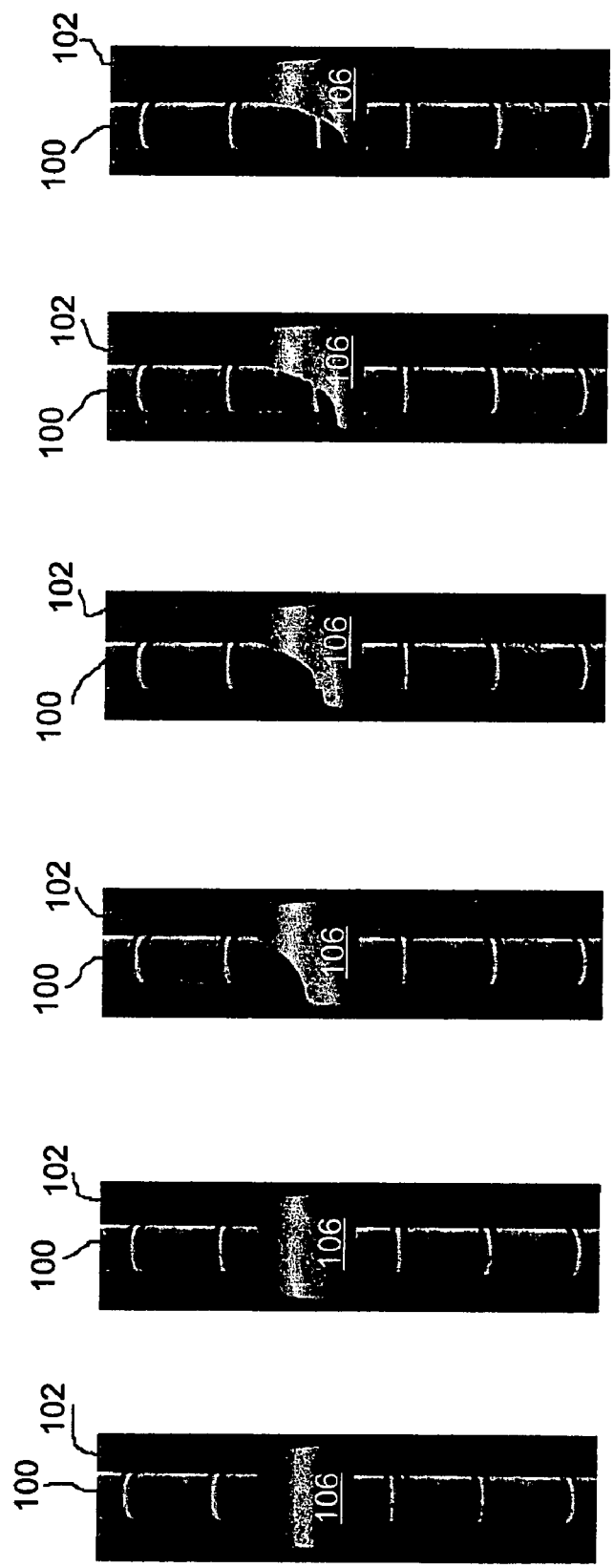

THREE-DIMENSIONAL WELLBORE VISUALIZATION SYSTEM FOR DRILLING AND COMPLETION DATA

This is the non-provisional of U.S. provisional application No. 60/553,486, filed Mar. 16, 2004, the contents of which are incorporated herein. This is a continuation of U.S. application patent Ser. No. 11/063,913 entitled "Three-dimensional wellbore visualization system for hydraulics analysis", filed Feb. 23, 2005, the contents of which are incorporated herein by reference.

BACKGROUND OF INVENTION

Those of ordinary skill in the art will appreciate that the oil industry often uses three-dimensional (3D) visualization to showcase its exploitation of the latest high-tech developments. (As used herein, the term "visualization" is intended to encompass a process involving the computer processing, transformation, and visual/graphical display of measured or simulated data to facilitate its interpretation.) Visualization has become a well-established planning and analytical tool for the geological and geophysical (G&G) segment of the industry. Benefits extend beyond technical issues, as communal visualization has promoted multi-disciplinary discussion and created opportunities to bring people together and improve the dynamics of E&P teams by providing clarity in the face of the ever increasing amount of data that forms the modern well construction process.

Similar success is being achieved in drilling. Early applications focused on well placement in complex reservoirs, and directional drilling to control well tortuosity and avoid collisions on multi-well platforms. More recent applications use 3D visualization to address drilling problems and link drilling operational data to earth models. Countless other drilling prospects should exist, especially considering that "making hole" occurs out of sight, miles below the earth's surface.

In the prior art, downhole visualization has focused principally on the trajectory of the borehole, particularly with the ever-increasing popularity of directional drilling. Knowing the precise location of the borehole at all points along its length is critical to ensure that the drilling operation succeeds ultimately in the borehole arriving at the desired production region.

Downhole video is a proven telepositioning method for mechanical inspection, fishing operations, and problem investigation in a wellbore. Unfortunately, downhole video cannot be used during drilling, because (a) nearly all drilling fluids are opaque; (b) normal drilling operations would have to be suspended; and (c) the drill string would interfere with camera operations.

Videos taken of simulated wellbores in the laboratory, despite temperature and pressure shortcomings, have contributed significantly to the industry's understanding of downhole behavior, especially hole cleaning and barite sag. Remarkable footage captured through transparent, inclined flow loops have documented the impact of different parameters on hole-cleaning efficiency, including hole angle, annular velocity, pipe eccentricity and rotation, low-shear-rate viscosity, flow regime, and avalanching cuttings beds. Video has also helped validate the field success with drilling horizontal wells at some sites with rheologically engineered biopolymer drill-in fluids, a hole-cleaning concept that was contrary to industry thinking at the time. Additionally, laboratory studies based on extensive video imaging helped convince the industry that barite sag was primarily a dynamic settling problem and not the static problem as previously thought.

Nevertheless, video examination of actual wellbores is not a practical alternative, meaning that other means must be employed to analyze dynamic parameters of the interior of a wellbore.

Outside of the oil industry, video has long been a mainstay to view objects not easily accessible. The medical field is perhaps the best known, and the colonoscopy is an excellent analogy to downhole video technology. Recent technological advancements have made it possible to perform a non-invasive procedure called a "virtual" colonoscopy. The virtual colonoscopy process involves performing a spiral (or helical) computer-aided tomography (CAT) scan, wherein a rotating x-ray machine follows a spiral path around the body. A high-powered computer uses the x-ray data to create detailed cross-sectional pictures of the body. The high-resolution, 2D pictures are then assembled like slices in a loaf of bread to construct a detailed, 3D image of the colon lining suitable for thorough analysis by the doctor.

Virtual images created for medical use invariably are based on measured data. Unfortunately, detailed data required along a well path cannot be measured with current technology. The alternative is to simulate the downhole drilling process with appropriate models. Logically, the accuracy of the models is important.

To address this problem, computer applications have been developed for simulating the internal environmental dynamics within wellbores based on known or modeled data about the well. Advanced software has emerged that considers, among other things, the effects of temperature and pressure on density and rheology. Numerous commercially-available examples of such analysis applications are known in the art. An interesting aspect of such programs is that the modules created for calculating equivalent static densities (ESDs) are based on numerical integration of short wellbore segments. This approach has set the stage for using techniques involving finite difference analysis for other calculations. Generally speaking, hydraulics applications function to take a number of dynamic, depth-varying parameters for a wellbore (and drillstring) as inputs to provide as an output one or more indicators of well performance and behavior.

Accuracy is a serious issue regarding downhole simulation. Often measured data or a combination of simulated and measured data can be used simulating the internal environmental dynamics within wellbores. Currently much of this data is presented in traditional two dimensional graphs or in data tables. However, in many cases, large datasets make this cumbersome or mentally impossible. Thus there remains an on-going need for methods of viewing and analyzing the data sets in a mentally appealing manner.

SUMMARY

The present invention is directed to innovative computer-based methods and systems for exploiting additional drilling visualization opportunities.

In accordance with one aspect of the invention, systems and methods are provided for permitting interactive 3D visualization of the inside of a wellbore, including the drillstring, accumulation of drill cuttings, filter cake beds and fluid flow, which is a more natural and intuitive view for most drillers, whether on the drilling rig floor or in a remote office. Simulated downhole conditions can be critically examined while navigating the well from surface to total depth (TD) using a standard personal computer and a joystick or other user input device. This capability is useful for interpreting large data sets, mitigating drilling problems, training, and maximizing collaboration among multi-disciplinary teams and some drilling teams separated by a common language. It also places downhole modeling under the microscope and helped highlight important areas where renewed effort is required.

In one embodiment, the wellbore visualization focuses on drilling fluid hydraulicsand the environmental dynamics related to fluid flow in the wellbore, important topics selected for several reasons, include the following:

- hydraulics is central to the safe, economic, and efficient drilling of all wells, and a critical concern for deepwater, HTHP, and highly directional wells;
- hydraulics is the primary cause and/or the solution of many common drilling problems;
- drilling personnel can have difficulty visualizing true downhole hydraulics behavior;
- step improvements in hydraulics simulation software have provided better insights into downhole behavior;
- video images captured through transparent laboratory flow loops have been effective in changing industry views on hole cleaning and barite sag; and
- hydraulic parameters lend themselves to effective visualization.

In accordance with another aspect of the invention, a system is provided which includes a graphics engine and simulation models. Optionally, measured datasets may also be utilized or combined with the simulated data. The graphics engine uses 3D perspective rendering and programming techniques similar to those employed in common computer gaming applications. This approach makes it possible to run high-quality, interactive graphics on conventional "personal" class computers (PCs). A finite difference method used by the hydraulics program makes it possible to borrow an innovative concept from the medical field to integrate the modeled data, optional measured data and the graphics and visualization aspects described herein.

Additional details and information regarding the disclosed subject matter can be found in the following description and drawings.

BRIEF DESCRIPTION OF THE DRAWINGS

The foregoing and other features and aspects of the present invention will be best understood with reference to the following detailed description of a specific embodiment of the invention, when read in conjunction with the accompanying drawings, wherein:

FIGS. 6a through 6f are renderings of a side projection views of a wellbore and drillstring at a sequence of well depths showing variations in a velocity profile resulting from drillstring eccentricity;

DETAILED DESCRIPTION

In the disclosure that follows, in the interest of clarity, not all features of actual implementations are described. It will of course be appreciated that in the development of any such actual implementation, as in any such project, numerous engineering and technical decisions must be made to achieve the developers' specific goals and subgoals (e.g., compliance with system and technical constraints), which will vary from one implementation to another. Moreover, attention will necessarily be paid to proper engineering and programming practices for the environment in question. It will be appreciated that such a development effort might be complex and time-consuming, but would nevertheless be a routine undertaking for those of ordinary skill in the relevant fields.

Furthermore, for the purposes of the present disclosure, the terms "comprise" and "comprising" shall be interpreted in an inclusive, non-limiting sense, recognizing that an element or method step said to "comprise" one or more specific components may include additional components.

In this description, the terms "up" and "down"; "upward" and "downward"; "upstream" and "downstream"; and other like terms indicating relative positions above or below a given point or element are used in this description to more clearly described some embodiments of the invention. However, when applied to apparatus and methods for use in wells that are deviated or horizontal, such terms may refer to a left to right, right to left, or other relationship as appropriate.

Essentially, and in accordance with one embodiment of the invention, the drill string and annulus (borehole) are subdivided into segments of predetermined length, preferably 50 to 100-ft cells or segments for simulation purposes. The selection of the segment size will be dependent on any number of factors that should be well known to one of skill in the art including, desired resolution and precision of the data, computing power, available memory, processing time and speed requirements, and so forth. Each cell is assigned certain key parameter values such as rheological properties, temperature, pressure, density, eccentricity, inclination, azimuth, geometry, velocity profile, cuttings bed depth, formation lithology, etc. The cells are like the slices in the loaf-of-bread analogy previously used to describe the virtual colonoscopy. At each depth into the borehole, the aforementioned and perhaps other depth-varying parameters are specified.

Figure 1:
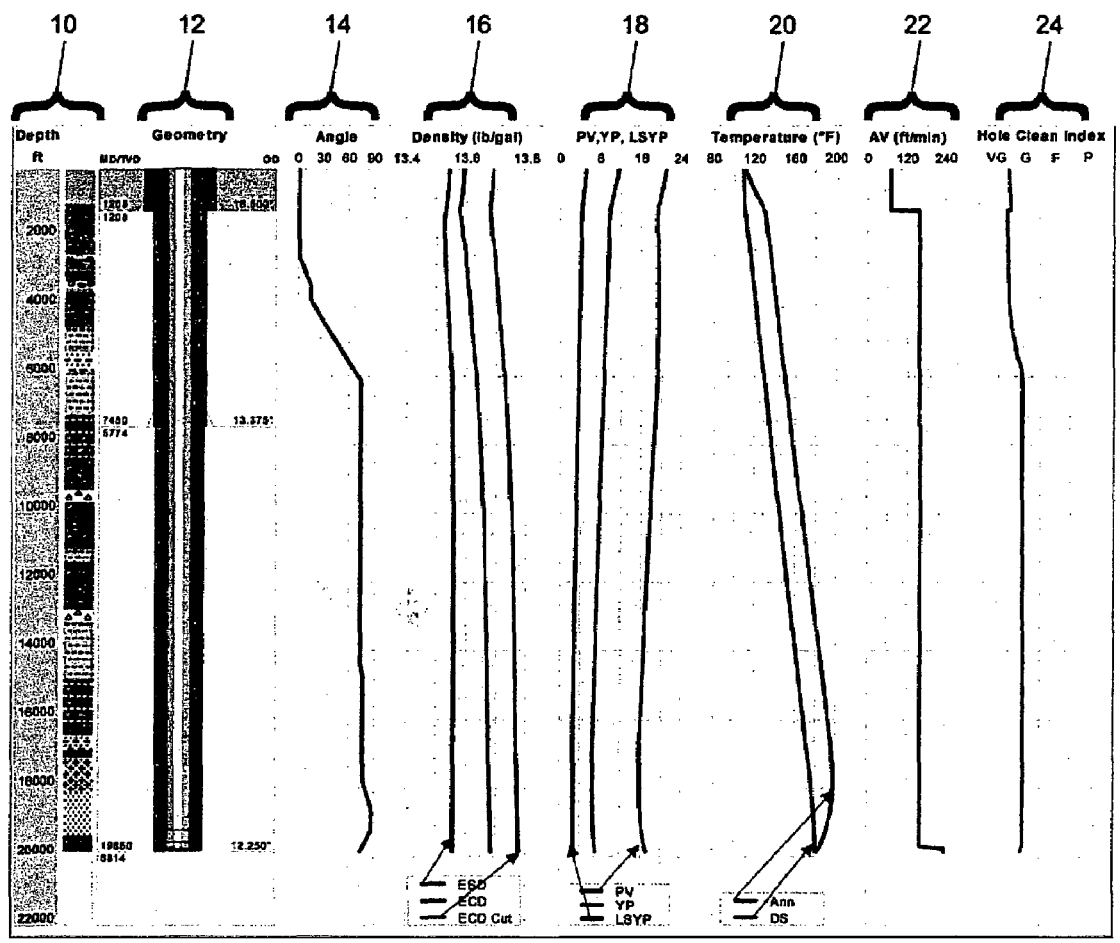
FIG. 1 is a plot of well data including a plurality of different well parameter datasets.

Turning to FIG. 1, there is shown a graphical output of well data plotted versus well depth. As shown in FIG. 1, the well data comprises a plurality of data sets each corresponding to a particular depth-varying parameter of a well. In one embodiment, the plots are profile snapshots of the parameter values from surface to total depth at a point in time. However, those of ordinary skill in the art having the benefit of the present disclosure will appreciate that the invention may be implemented in such a manner as to allow for the receipt of real-time data during an actual drilling operation which would lead to ongoing changes in the resultant data visualization.

Much data is presented in the plots of FIG. 1, including: a schematic representation of borehole/drillstring geometry, identified with reference numeral 12 in FIG. 1; the borehole angle (reference numeral 14); equivalent static and circulating densities (reference numeral 16); plastic viscosity, yield point, and low shear rate yield point (LSYP) (reference numeral 18); annulus and drillstring temperature (reference numeral 20); annular fluid velocity (reference numeral 22); and a quantification of hole quality referred to as a "Hole Clean Index" (reference numeral 24). The Hole clean Index is computed based on the calculated accumulation of drilled solids in the wellbore. Despite the large amount of information represented by the plots in FIG. 1, however, the presentation of this data in the format of FIG. 1 is believed to be less than optimal in conveying to the drilling operator an accurate overall sense of the drilling operation and conditions. The goal of visualization in accordance with the presently disclosed embodiment of the invention is to transform these profiles into navigable 3D renderings that provide the user a more comprehensive understanding of the overall drilling operation.

One of skill in the art should appreciate that while the above description has utilized simulated or modeled data in the visualization, real time or measured data sets may also be utilized. With the rapid advances in micro-sensors and other downhole tools, it is envisioned that the present invention will be useful for visually presenting such data alone or in combination with the simulation data. In this way a virtual reality wellbore can be visualized that is at least partially based on the actual reality of the wellbore and downhole environment.

As previously noted, the system and method of the present invention are preferably implemented on a computer such as those commonly referred to and nearly universally recognized as "personal computers," including at least one microprocessor, memory, display device(s), user input device(s), and so on, as would be familiar to those of ordinary skill in the art. The data displayed in FIG. 1 is shared with a graphics engine application executed by the computer system in the form of matrices stored in global shared memory, a technique that can prove useful for real-time applications. In order to give the illusion of continuity and improve resolution, the 100-ft segments commonly used by hydraulics simulation programs are preferably further subdivided into shorter cells for the graphics engine, in the interest of enhancing visual realism and continuity in the rendering of the wellbore and drillstring.

The selection of a particular graphics engine is not believed to be relevant for the purposes of the present invention; those of ordinary skill in the art will be familiar with numerous commercially-available graphics applications suitable to perform the graphics processing described herein. Preferably, the graphics application(s) used to practice the invention as described herein is sufficiently optimized to be compatible with the processing capabilities of the computer system used in a given implementation of the invention. That is, a more sophisticated, higher-resolution graphics system may require correspondingly greater processing power in the computer, as would be apparent to those of ordinary skill in the art.

Figure 2:
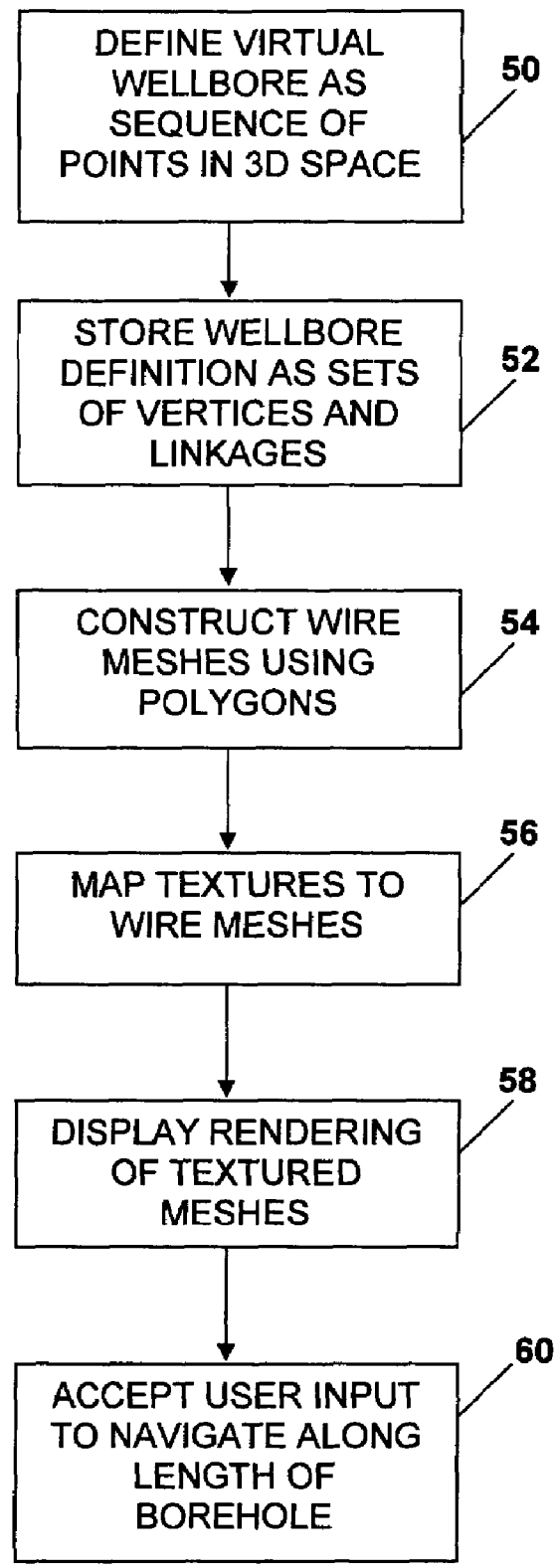
FIG. 2 is a flow diagram of a well data visualization process in accordance with one embodiment of the invention.

FIG. 2 is a flow diagram showing a visualization process in accordance with one embodiment of the invention. Using the available data that is displayed in FIG. 1, defining the well survey as a sequence of points in 3D space is the first step in creating the virtual wellbore, as represented by block 50 in FIG. 2. Next, a vertex list, i.e., a collection of points in the 3D space, and the index buffer, i.e., linkages between the vertices, are preferably stored in graphics memory for quick and efficient recall. This is represented by block 52 in FIG. 2.

Next, the graphics engine delineates meshes, also commonly referred to as "wire frames," are mathematically delineated at each point along the path based on the vertex list and linkages, as represented by block 54. The meshes are the surfaces on which textures later will be mapped, as would be understood by those of ordinary skill in the art. In accordance with conventional graphics processing and rendering techniques, each mesh (equivalent to data cells from the hydraulics program) is constructed using an array of polygons, preferably triangles, which are the simplest polygons.

Those of ordinary skill in the art will appreciate that the prior art is replete with methods and systems for creating wire frame or wire mesh computer models of three-dimensional objects and surfaces, and describing particular details of a process of defining the virtual wellbore model is not believed to be necessary for the purposes of the present disclosure.

Figure 3A:
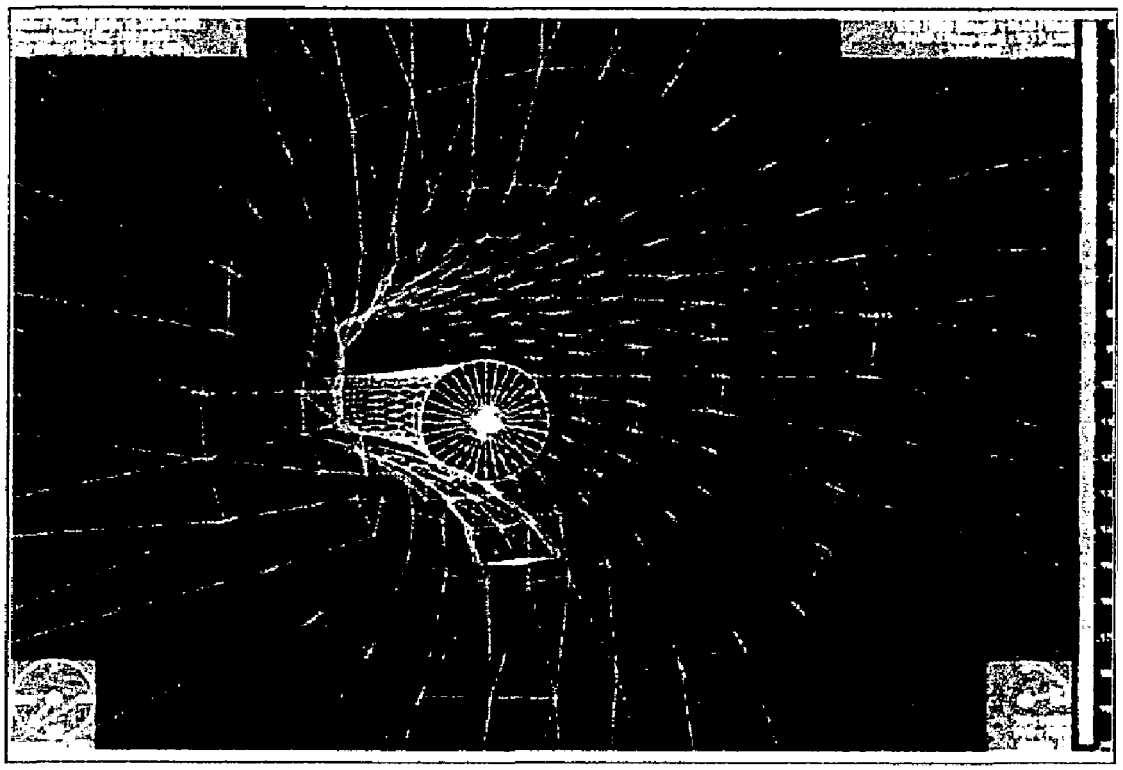
FIG. 3a is a rendering of a wire-mesh skeleton for an internal view of a wellbore and drillstring generated by a system in accordance with one embodiment of the invention.
Figure 3B:
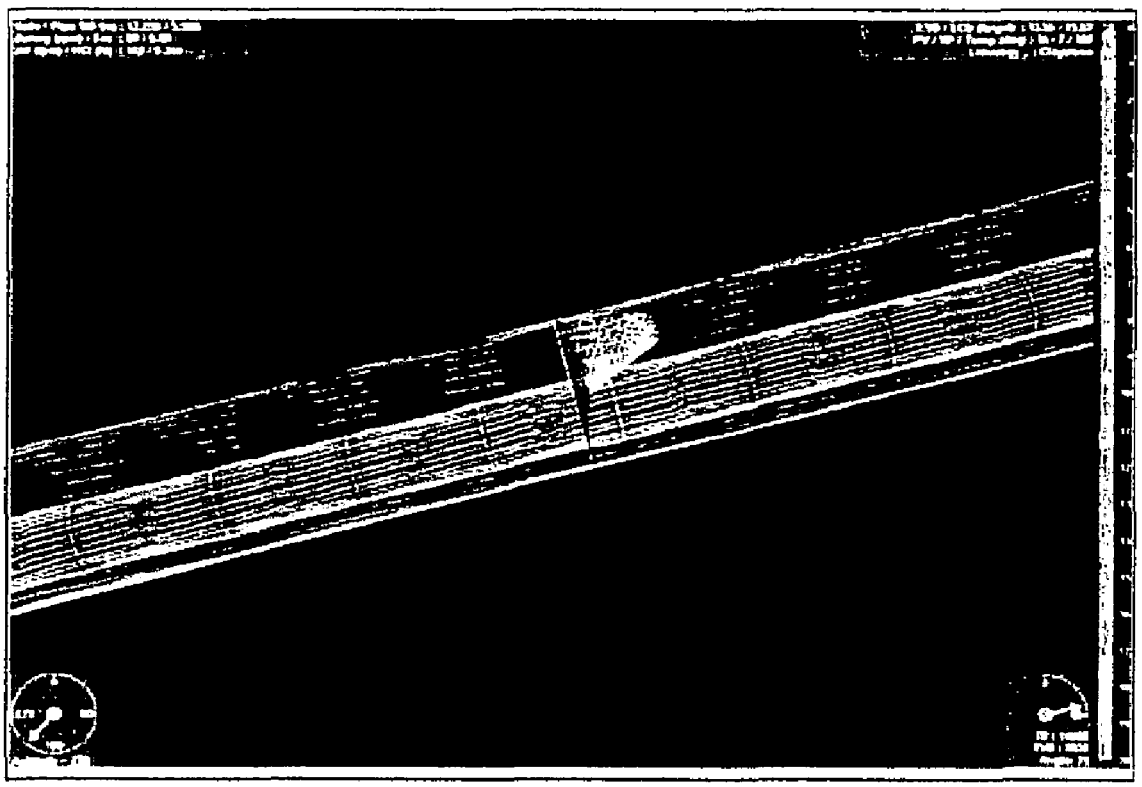
FIG. 3b is a rendering of a wire-mesh skeleton for a side-projection view of a wellbore and drillstring generated by a system in accordance with one embodiment of the invention.

The collection of mesh skeletons can be displayed as an internal borehole view as shown in FIG. 3a and as a side projection as shown in FIG. 3b. The lack of uniformity in the borehole view illustrates how rugosity can be introduced in the images. Next, the meshes preferably have suitable textures mapped thereon, as represented by block 56 in FIG. 2. Those of ordinary skill in the art will appreciate that in basic texture mapping, an image is applied to each polygon (triangle) in a mesh by assigning texture coordinates to the polygon's vertices. These coordinates index the texture image, and are interpolated across the polygon to determine, at each of the polygon's pixels, a texture image value. The result is that some portion of the texture image is mapped onto the polygon when the polygon is viewed (rendered) on the screen.

Figure 9A:
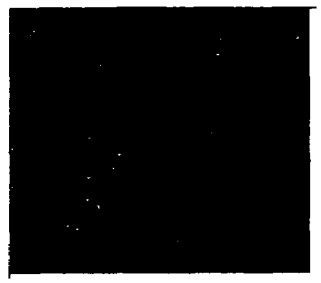
FIGS. 9a through 9g are texture maps of various formation materials applied to wire-mesh models of wellbores and drillstrings in accordance with one embodiment of the invention.
Figure 9B:
Figure 9C:
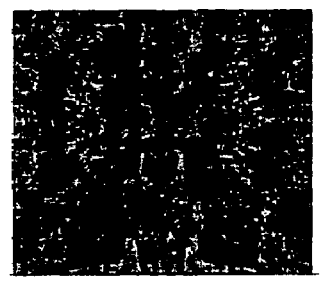
Figure 9D:
Figure 9E:
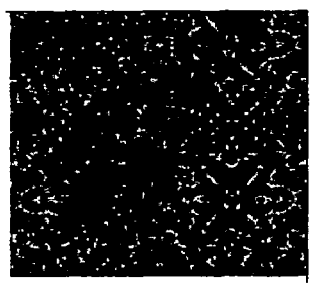
Figure 9F:
Figure 9G:

Some exemplary textures are shown in FIGS. 9a through 9g. In particular, a sand texture is shown in FIG. 9a, a claystone texture is shown in FIG. 9b, a limestone texture is shown in FIG. 9c, a shale texture is shown in FIG. 9d, and a seawater texture is shown in FIG. 9e. FIG. 9f shows a drill collar image that can be mapped to the virtual drillstring at the location of each drill collar. Similarly, FIG. 9g shows a drill bit image that can be mapped to the virtual drillstring at the location of the drill bit.

In one embodiment, the rock and formation textures (FIGS. 9a through 9e) were created from photographs of actual materials. Each is transformed into a "seamless" graphic using the Möbius-strip concept for continuity and effect, as would be familiar to those of ordinary skill in the art of computer-based graphics processing. That is, the top edge of each texture map matches seamlessly with its bottom edge, as does the left edge with the right edge. In this way, when the texture mapping is performed on the wire mesh models, the result is a seamless rendering of the drillstring and borehole. The bit (FIG. 9g) is its own mesh created using a simple 3D solids modeling program.

It should be appreciated that the meshes can be manipulated and adjusted to show common, if not problematic, borehole behavior. For examples the meshes and textures may be used to visually show washouts, breakouts, rugosity, keyholing, constrictions due to formation swelling, stuck tools, wellbore 'junk' or 'fishes', the influx of formation water, formations involved in a blowout, as well as other conditions and environments of typical of the wellbore that should be well known to one of skill in the art.

Figure 4A:
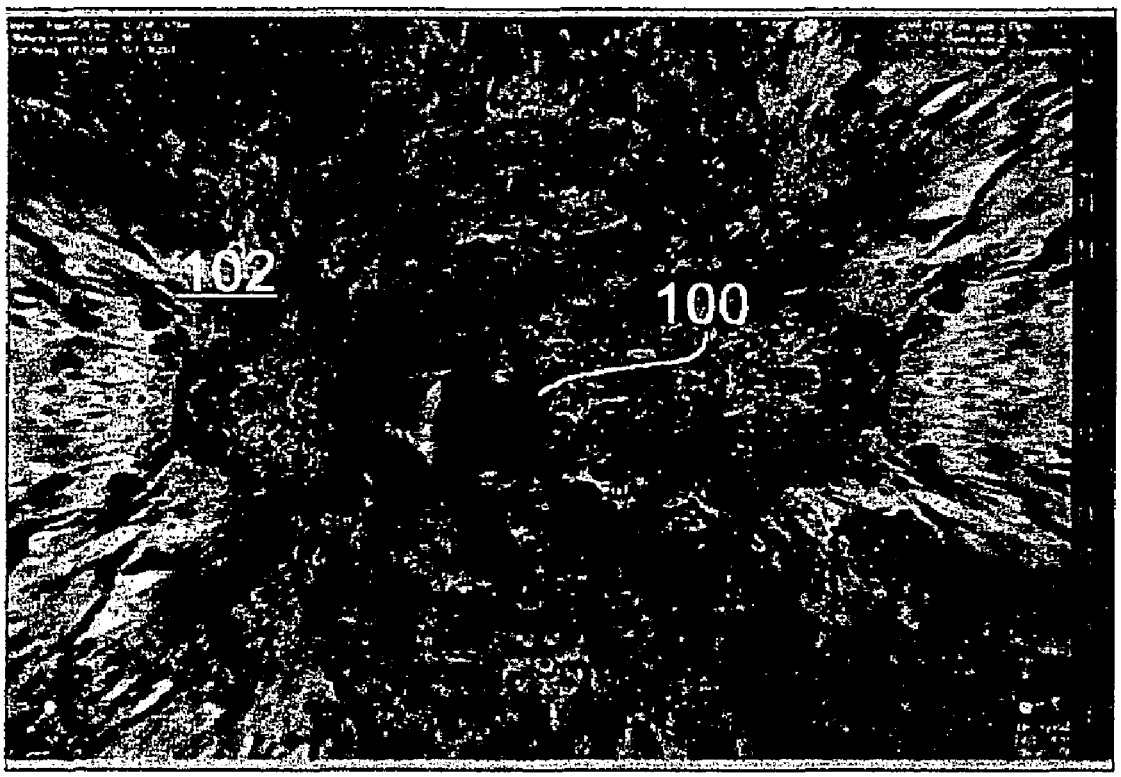
FIG. 4a is a rendering of an internal view of a wellbore and drillstring after texture mapping of a wire-mesh skeleton modeling of the same.
Figure 4B:
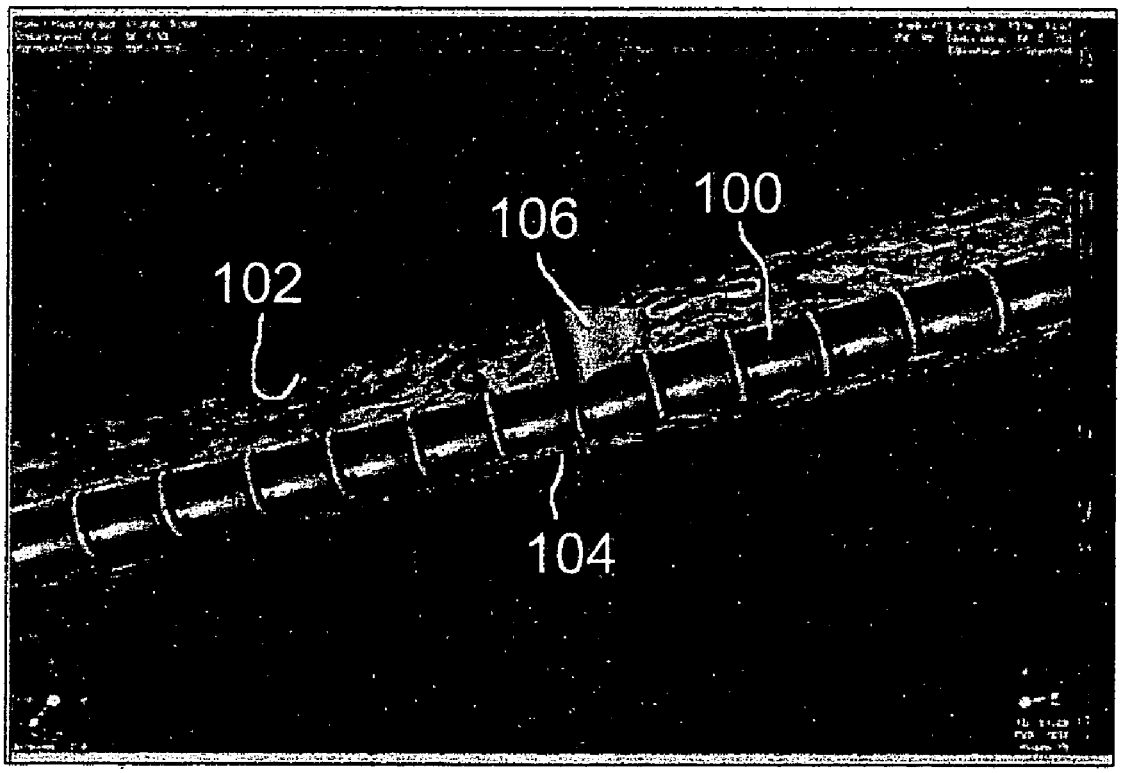
FIG. 4b is a rendering of a side-projection view of a wellbore and drillstring after texture-mapping of a wire-mesh skeleton of the same and including a velocity profile at a selected location in the wellbore.

Having fully defined the virtual wellbore as an ordered sequence of texture-mapped meshes, each having specified depth-varying parameter values associated therewith, the wellbore can now be displayed (rendered) on a suitable monitor or display screen. This is represented by block 58 in FIG. 2. FIGS. 4a and 4b are examples of renderings of the wellbore in the exemplary embodiment. For reference, the images in FIGS. 3a, 3b, 4a, and 4b were created from the data presented in FIG. 1 at 14,680-ft measured depth, 7,830-ft true vertical depth (TVD), and 75° inclination.

In the presently preferred embodiment, each mesh has associated therewith data points for the borehole, cuttings bed, drill string, and bottomhole assembly. The vertices can be adjusted and even rotated, but are static and cannot be translated up and down the well path. On the other hand, a dynamic mesh is provided for a velocity profile, so that the 3D velocity profile can be continually reconstructed as the virtual camera navigates the wellbore path under user control, as represented by block 60 in FIG. 2 and as is hereinafter described in greater detail. As an illustration of this, refer to FIGS. 3b and 4b, wherein a velocity profile designated with reference numeral 106 is shown.

Every mesh also has associated material RGB (red-green-blue) components that allow highlighting for special effects. The color components—diffuse (scatter), ambient (common), specular (shiny), and emissive (glow)—determine how materials respond to a light source. One use of these properties is to effectively place a translucent filter over any texture, permitting appropriate borehole textures to be highlighted with different colors to represent numerical parameters that otherwise would be difficult to represent.

Figure 10:
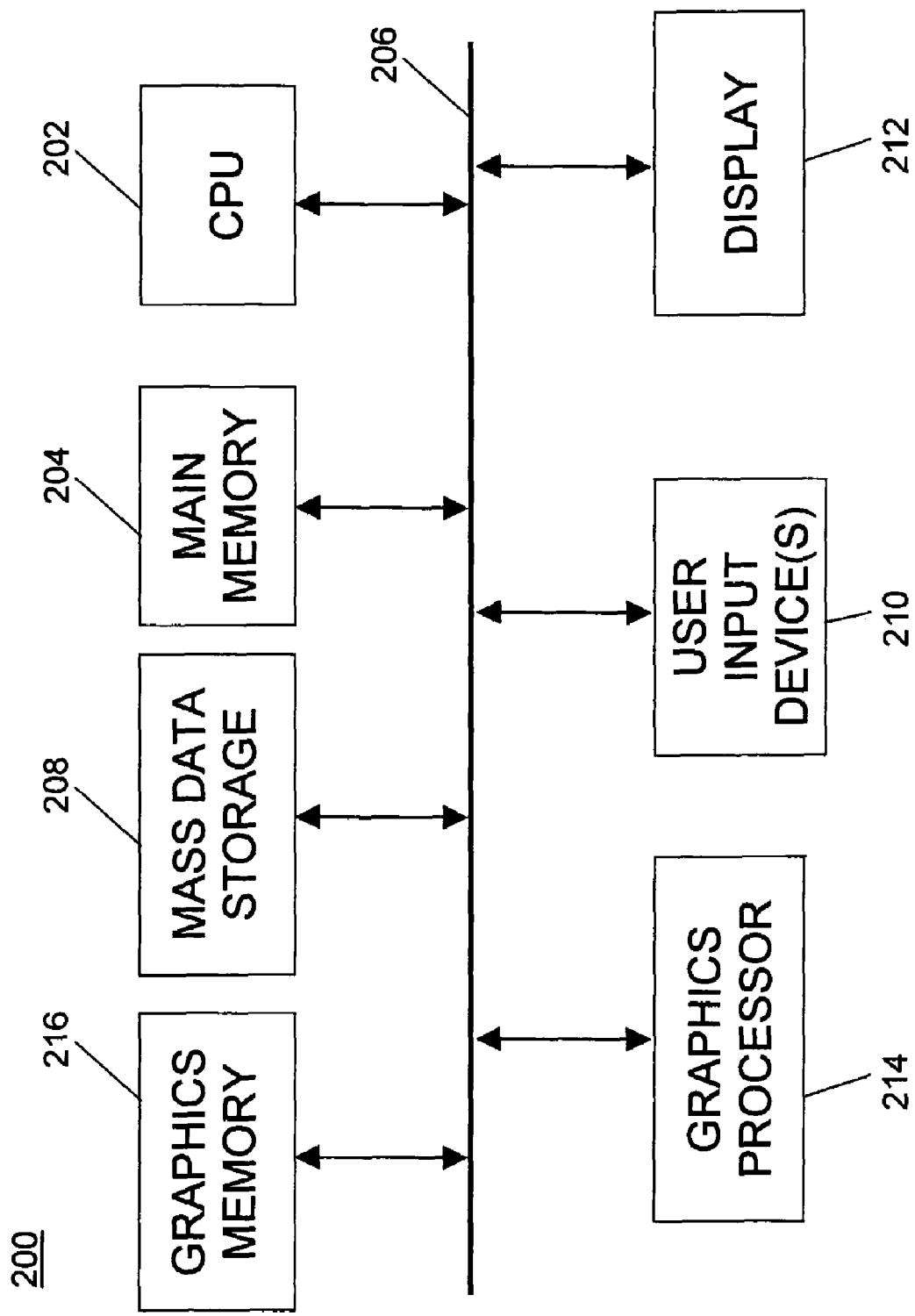
FIG. 10 is a block diagram of a computer system implementing a visualization system in accordance with one embodiment of the invention.

In the preferred embodiment, the interactive visualization system runs on a standard Microsoft® Windows®-based, standard-issue computers. This enables immediate review of the visualization results in 3D graphics, and makes the visualization application more accessible in other settings. FIG. 10 is a simplified block diagram of a computer system 200 suitable for the purposes of practicing the present invention. In accordance with conventional computer architectures, computer system 200 comprises a central processing unit (CPU) 202. In a preferred embodiment, CPU 202 is a conventional personal computer processing unit such as an Intel® Pentium®- or Celeron®-class processor operating at a clock speed on the order of two to four gigahertz or so.

Further in accordance with conventional computer architectures, CPU 202 is coupled to main memory 204 via a system bus 206. Main memory preferably has a capacity on the order of at least 500 megabytes or so. A mass data storage unti 208, such as a conventional hard disk drive is also accessible by CPU. In one embodiment, data storage unit 208 initially stores the well data shown in FIG. 1. One or more user input devices, represented by block 210, are also necessary, as would be apparent to those of ordinary skill in the art. Among the useful user input devices that may be provided are a keyboard, a mouse or other cursor control device, and perhaps others, such as a joystick, game pad, or the like, as will be hereinafter described.

Optionally, a graphics accelerator card 214 (common in most state-of-the-art personal computers) may be provided to ensure efficient operation of the visualization system. Providing graphics processor 214 lessens the processing burden placed on main CPU 202, as would be recognized by those of ordinary skill in the art. Further, graphics processor 214 may have some amount of graphics memory associated therewith, thereby freeing up more memory capacity in main memory 204. Finally, of course, a graphics display device 212, such as a cathode ray tube, LCD display, or the like, is necessary to present the visualization renderings to the user.

Microsoft® DirectX® 9.0 is suitable as a graphics engine to develop the visualization system code. As would be known to those of ordinary skill in the art, DirectX® is a multi-media and gaming software development kit for Windows® that takes advantage of using Win32 API, such as multi-threading support, a TCP/IP stack, and numerous user interface features. This basic graphics engine is sufficient for generating the high frame rates needed for smooth, lag-free operation. "Smart" rendering, for example, is one of the techniques used to maintain high frame rates during zoom operations by continuously optimizing the number of cells to display based on the camera viewpoint. For typical wells, the up-and-down navigation rate is in the order of 6-8,000 ft/min. Also, code optimization for speed minimizes processor requirements for graphics, leaving considerable time for intermediate engineering calculations.

In the preferred embodiment, graphics for the drilling visualization application are rendered based on the position, orientation, and viewpoint of a "virtual camera" that is navigated along and around the wellbore and drillstring by the user through manipulation of user input device(s) 210. As used herein, the term "navigate" is intended to refer to the process whereby the user, using user input device 210 such as a keyboard, mouse and/or a joystick, controls a location along the length of the borehole at which the data illustrated in FIG. 1 is used to generate a visual depiction of the borehole and drillstring. Navigation further entails controlling the orientation of the virtual camera relative to the borehole and drillstring.

As noted, various user input devices 210 are available to permit the user to change the camera attributes and navigate through and around the well path. One option is a computer keyboard, but the ubiquitous joysticks and gamepads used for consumer games are preferable. Additionally, various commercially-available haptic interfaces, which permit user control in a three-dimensional virtual space may be used. Haptic interfaces have the added advantage of being capable of providing tactile and other sensory feedback to the user, thereby enhancing the ability of the system to communicate information about the modeled wellbore and drillstring based on the available data, which may be otherwise difficult to present to the user.

Conventional action mapping is used to automatically or manually interface different input devices to the software. In one embodiment, the set of actions includes camera movements down and up the hole, side-to-side (rotation), zoom, and internal and side projections. The internal projection simulates camera movements like the downhole video example discussed previously. Side projections can combine navigation along the well path, zoom (in and out), and 360° rotation for maximum ability to critically examine the simulated downhole hydraulics.

Figure 5A:
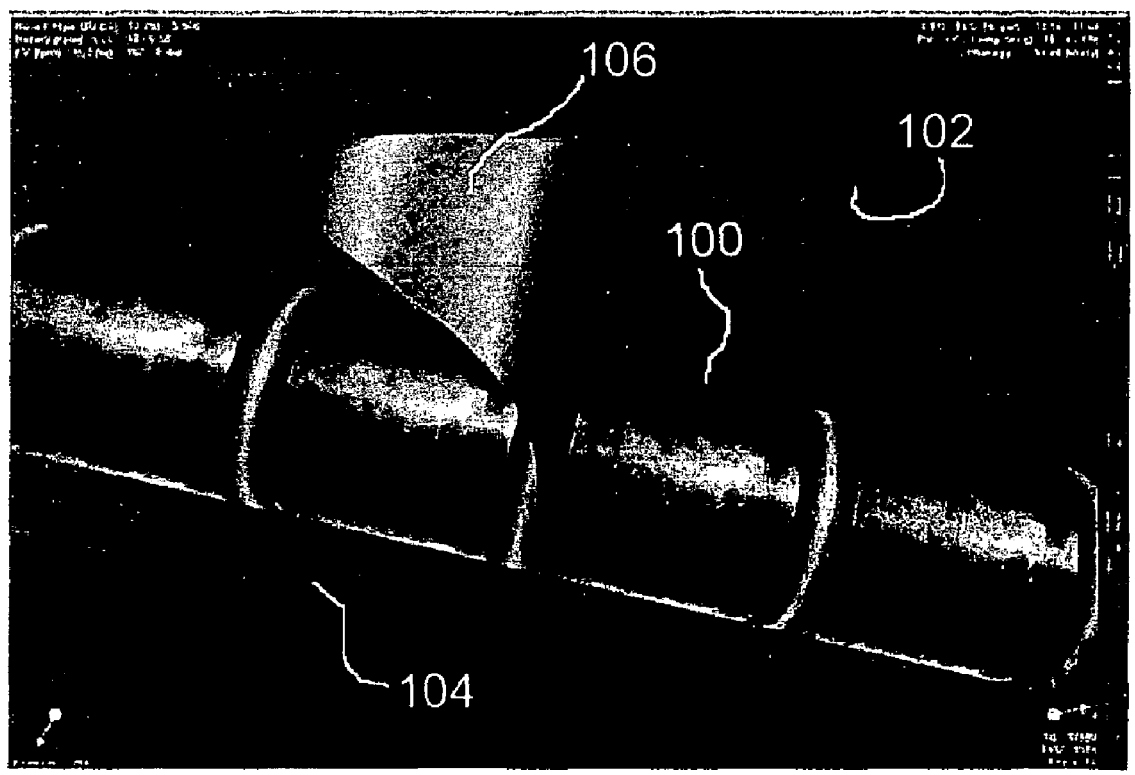
FIGS. 5a, 5b, and 5c are other renderings of side-projection views of a wellbore and drillstring after texture-mapping of a wire-mesh skeleton of the same and including a velocity profile at a selected location in the wellbore.
Figure 5B:
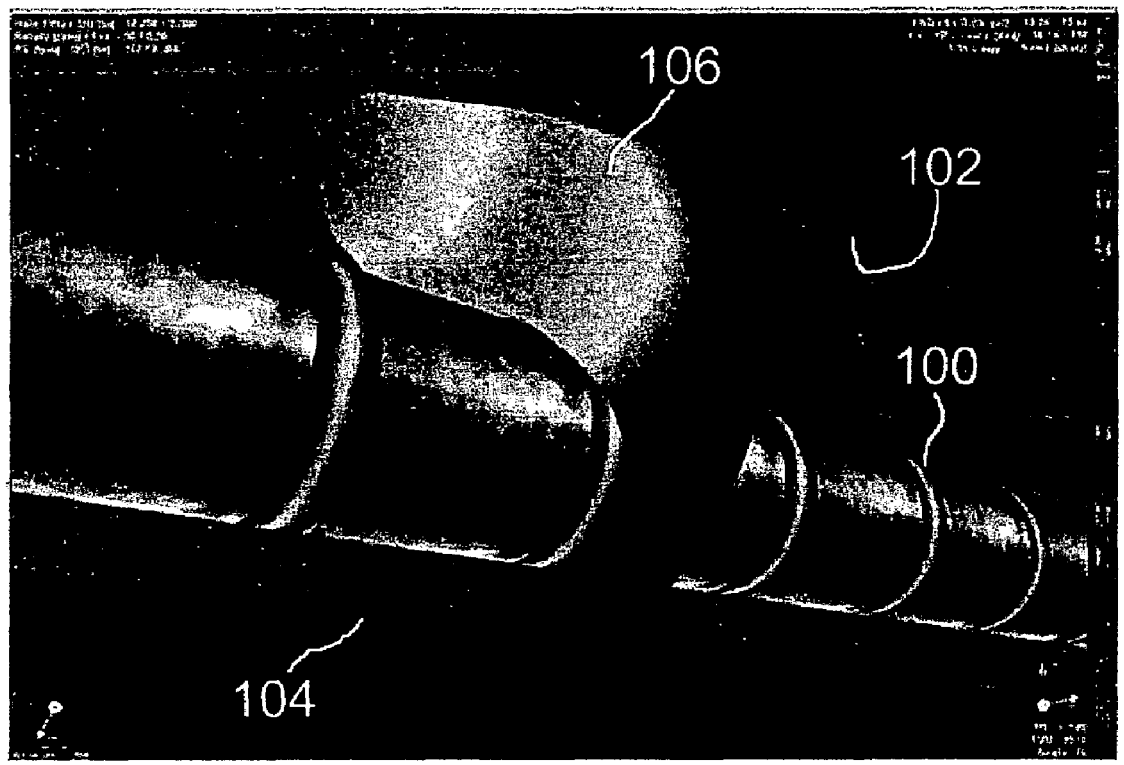
Figure 5C:
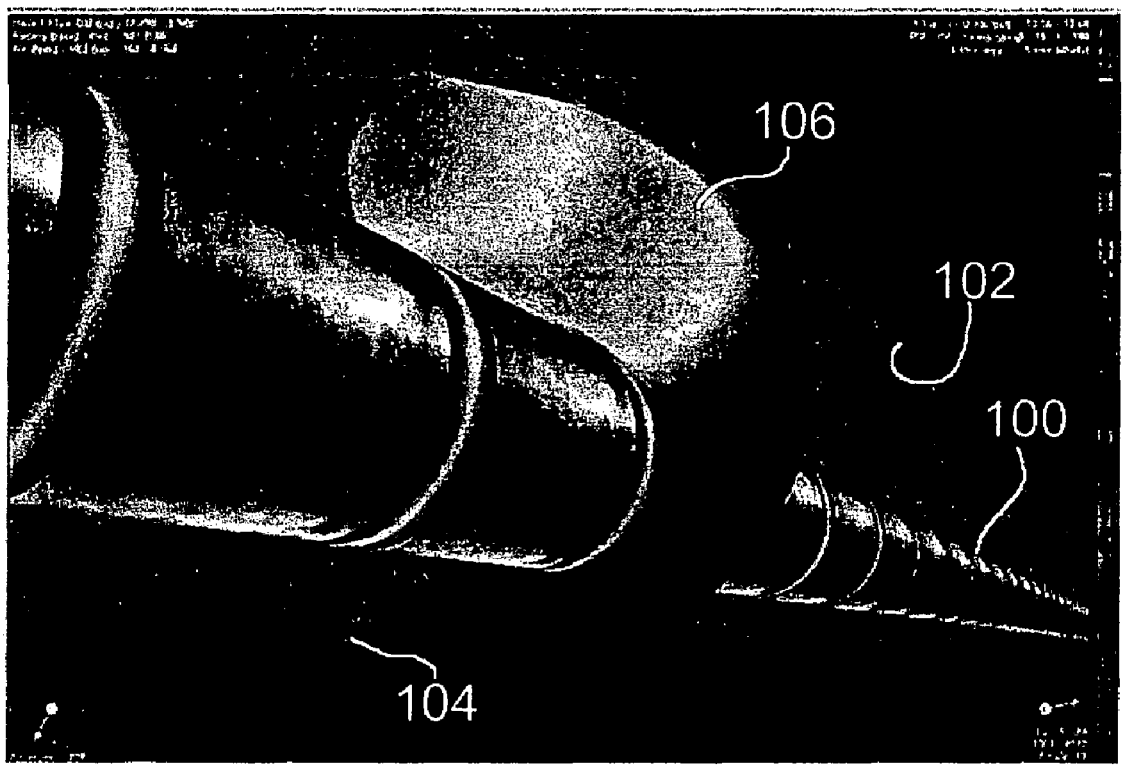
Figure 5D:
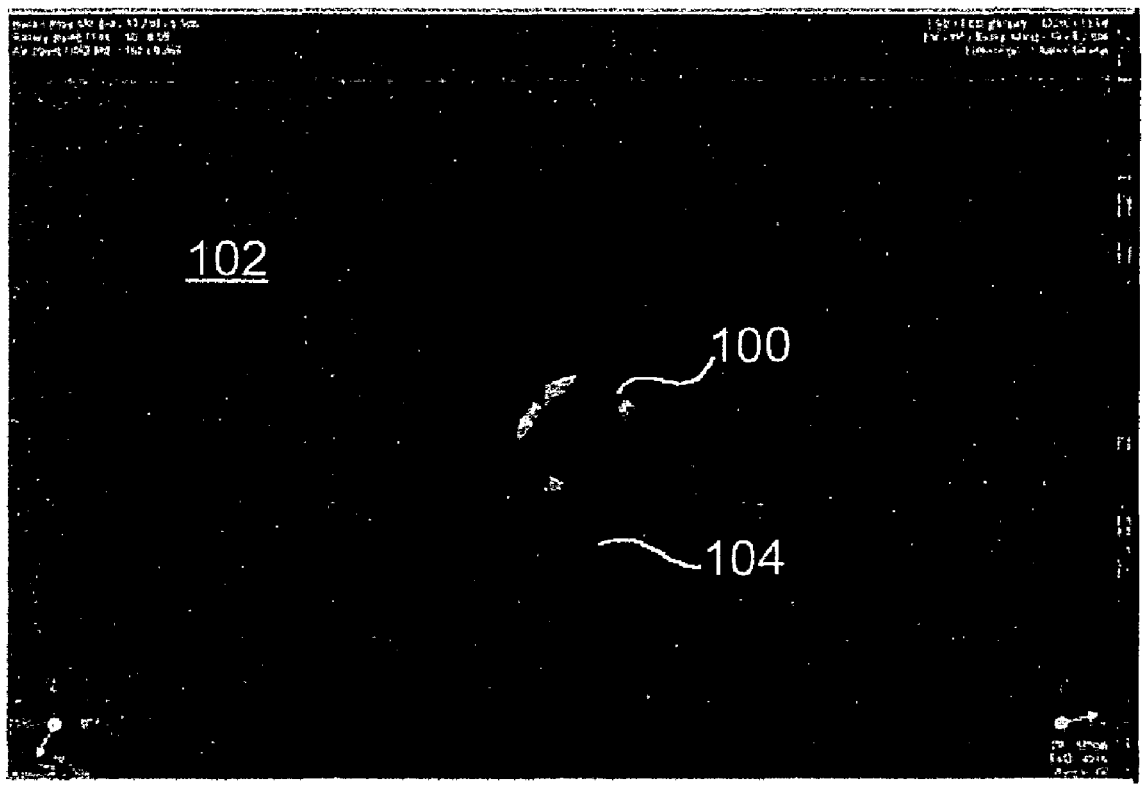
FIG. 5d is a rendering of an internal view of a wellbore and drillstring after texture-mapping of a wire-mesh skeleton of the same and including a cuttings bed in said wellbore.

Virtual camera zoom and rotation features are illustrated in FIGS. 5a through 5b, which show the example well at 17,580-ft measured depth, 8,516-ft TVD, and 76° angle. Figures 5a, 5b, and 5c are external views of the borehole and drillstring. In FIGS. 5a through 5d, the drillstring is designated with reference numeral 100 and the edge of the borehole is designated with reference numeral 102. FIG. 5d is an interior view of drillstring 100.

As can be seen in FIGS. 5a through 5d, the virtual camera can be zoomed, rotated, and reoriented with respect to drillstring 100. Also, a cuttings bed 104 is observable in FIGS. 5a through 5d.

In accordance with one embodiment of the invention, the data shown in FIG. 1 is sufficient for the visualization system to provide a velocity profile providing a visual indication of the velocity of drilling fluid in the wellbore at any location to which the user has navigated the visualization. In FIGS. 5a through 5c, such a velocity profile is designated with reference numeral 106. In the presently disclosed embodiment, velocity profile 106 is somewhat analogous to a virtual flexible membrane surrounding the drillstring. Depending upon the modeled velocity of the drilling fluid, this virtual membrane is deformed, much like a balloon, such that points of higher velocity cause greater deformation in the topology of the virtual membrane. Thus, higher peaks in the topology of the velocity profile correspond to higher velocity fluid flow. Furthermore, a spectrum of colors can be defined to a range of velocities, such that the user is provided with even further visual feedback as to the fluid velocity around the drillstring.

Navigation permits visual analysis of the entire data set. For example, the sequence of images in FIGS. 6a through 6f illustrates the effects of changing eccentricity on the calculated velocity profile 106. It can be seen in FIGS. 6a through 6f that in the section of borehole 102 ranging from 1,632 feet (FIG. 6a) to 1,822 (FIG. 6f), the drillstring 100 gradually moves from concentric to highly eccentric on one side of the borehole. It can further be observed from FIGS. 6a through 6f that the visual indication of velocity profile 106 changes to reflect the changing fluid dynamics resulting from this increasing eccentricity.

Figure 7:
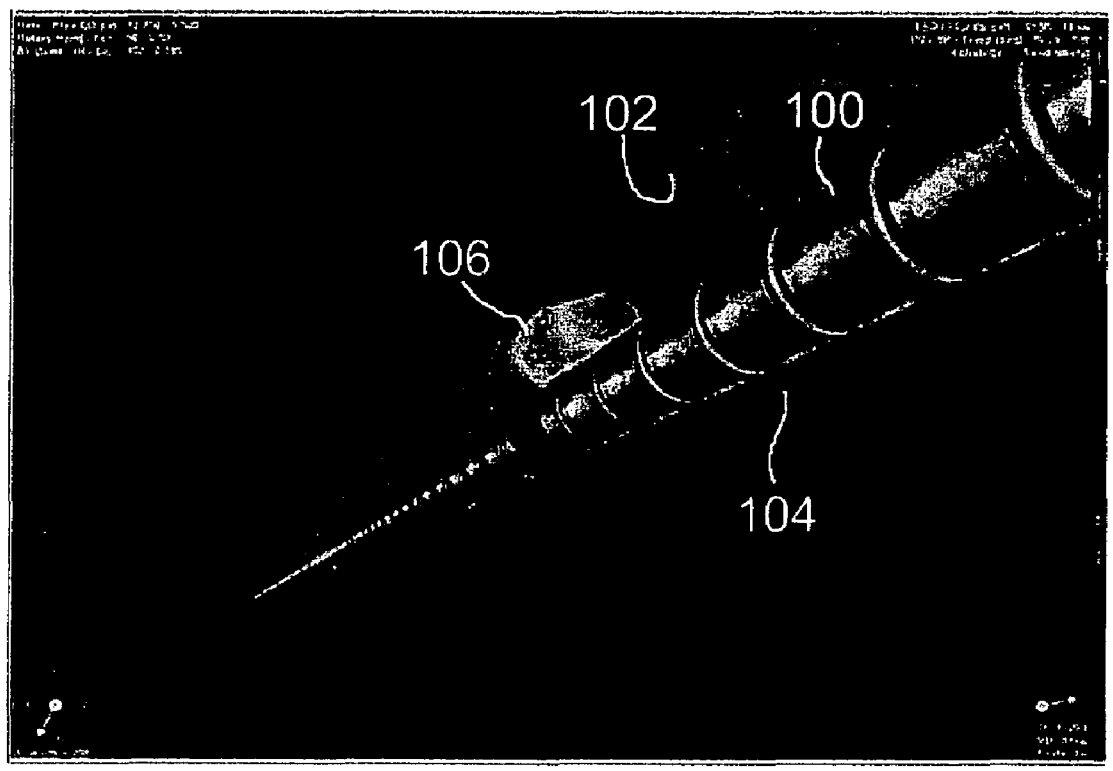
FIG. 7 is a rendering of a perspective view of a wellbore and drillstring, including a velocity profile and a cuttings bed.

FIG. 7 is a visualization of the well data at 17,280 ft after reducing the modeled flow rate to 500 gal/min. The cuttings bed 104 is the result of the inclination, pipe eccentricity, penetration rate, mud properties, skewed velocity profiles, and inadequate flow rate.

Figure 8:
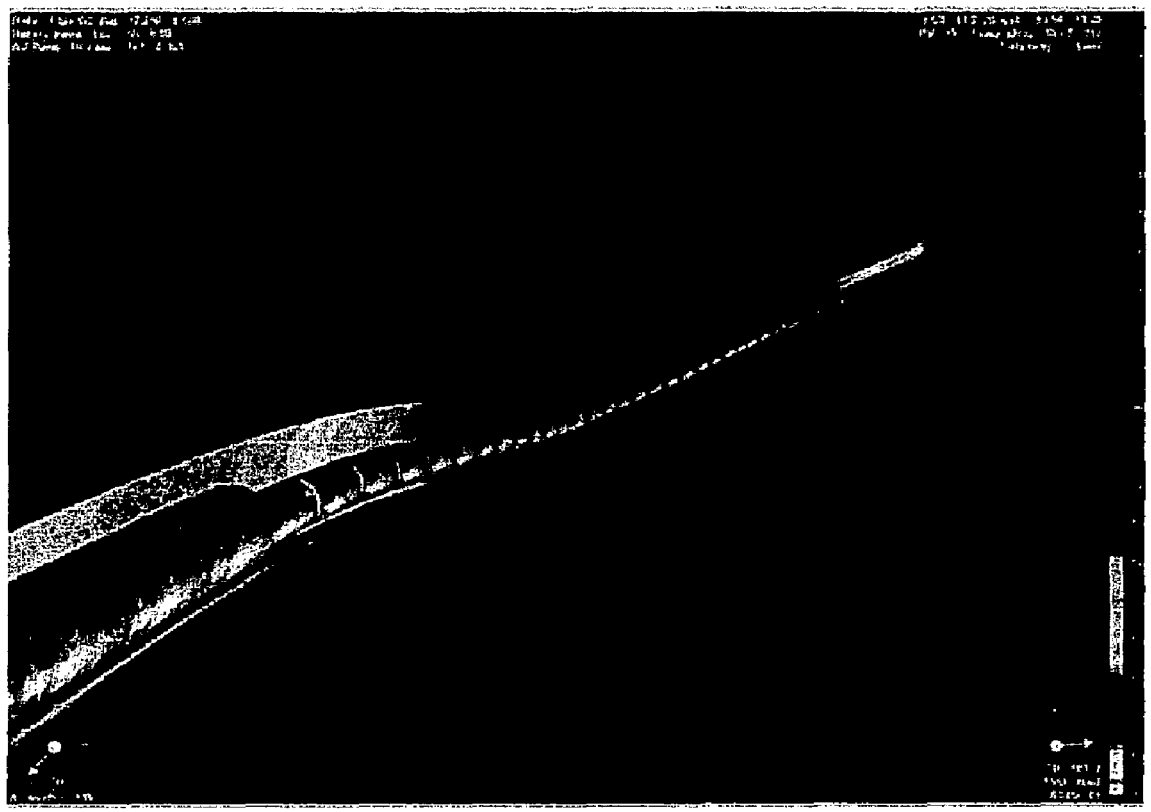
FIG. 8 is a rendering of a perspective view of a wellbore and drillstring with a spectral indication of wellbore temperature varying with depth.

Preferably, the data structure on which the visualization system of the present invention is based is such that any numerical value in the cell records can be displayed and represented in the 3D visualization graphics. However, some parameters are easier to represent than others. A color-coding system is a common option used in graphics for analog display of numerical data, especially those difficult to represent. Downhole density, ESD, ECD, and temperature are examples. Material RGB components and texture highlighting described above are used in FIG. 8 to show the annular fluid temperature profile for the sample well. As shown in FIG. 8, instead of texture-mapping the sample formation textures from FIGS. 9a through 9e on the mesh corresponding to the borehole sidewall 102, instead colors corresponding to the temperature data (element 20 in FIG. 1) are shown, providing the user with a visual indication of the temperature gradients along the length of the borehole. The user can then note, for example, that in the example of FIG. 8, the maximum annular temperature occurs off bottom at about 18,000 ft.

Texture highlighting can also be used to focus attention on cells that indicate potential or existing problems. A cuttings bed height above a preset level is a simple example. User adjustable rules can be used to direct the software to automatically seek out problem sections and display key aspects using a predefined sequence. While audio is currently not included in the software, it is contemplated that such information may be communicated to the user using voice-generation techniques. For example, the software may be programmed to alert the user that "The cuttings bed exceeds X centimeters at a depth of Y feet into the borehole."

From the foregoing detailed description of a preferred embodiment, it should be evident that a visualization system and method for efficiently presenting well data to a user has been disclosed. The system permits interactive 3D visualization of the inside of a virtual wellbore to help critically examine downhole hydraulics and related conditions during drilling. Mathematical models governing eccentricity, hole cleaning, velocity profiles, and other related engineering parameters can be validated using 3D visual results generated from the visualization of the data.

One of skill in the art should understand and appreciate that elements of the above specific embodiments, may be optionally eliminated to enhance the visual understanding of the data. For example it may be desireable to visually eliminate the drilling string or other aspects of the downhole environment so that a person is not visually overloaded. Further it should be appreciated that the above visualization method is not limited to time periods of active wellbore drilling. That is to say there are periods of inactivity (i.e. shut in) or non drilling activity, tripping the drill string, setting or cementing casing, hanging a liner, acid stimulation, fracturing, plugging, side tracking, and so forth that may also be visualized using the concepts of the present invention. For example a trip of the drill string might be visualized so that the operators fully understand the potential consequences of tripping.

Although specific embodiments and variations of the invention have been disclosed herein in some detail, this has been done solely for the purposes of describing various features and aspects of the invention, and is not intended to be limiting with respect to the scope of the invention. It is contemplated that various substitutions, alterations, and/or modifications, including but not limited to those implementation variations which may have been suggested in the present disclosure, may be made to the disclosed embodiments without departing from the scope of the invention as defined by the appended claims, which follow.

What is claimed is:

1. A computer-based method of visualizing a wellbore, comprising:
    (a) providing well data comprising a plurality of data sets each corresponding to a depth-varying parameter of a well comprising a borehole having a drillstring extending therein wherein at least one of the data sets corresponds to an interior of the borehole;
    (b) creating a three-dimensional model of said borehole, drillstring, and interior based on said well data;
    (c) selecting a location within the three-dimensional model corresponding to a position along said borehole; and
    (d) displaying a two-dimensional visual rendering of a segment of the three-dimensional model, the segment including said selected location.

2. The method of claim 1, wherein said step (d) of selecting a location comprises using a computer user input device to navigate along a visual rendering of said borehole.

3. The method of claim 2, further comprising selecting an orientation of said visual rendering using said user input device.

4. The method of claim 1, further comprising: (f) in said displayed visual rendering of said selected borehole location, including a velocity profile representation providing a visual indication of fluid velocity in said borehole at said selected location.

5. The method of claim 1, wherein said visual rendering comprises a texture-mapped wire mesh model of said borehole and drillstring.

6. The method of claim 1, further comprising: selectively displaying a visual indication of temperature along the length of said borehole.

7. The method of claim 6, wherein said visual indication of temperature comprises a spectrum of colors corresponding to different temperatures.

8. The method of claim 2, wherein said user input device comprises a keyboard.

9. The method of claim 2, wherein said user input device comprises a joystick.

10. A visualization system for a wellbore environment, comprising:
   (a) a source of a plurality of data sets each corresponding to a depth-varying parameter of a well comprising a borehole having a drillstring extending therein wherein at least one of the data sets corresponds to an interior of the borehole;
   (b) a processor programmed to create a three-dimensional model of the borehole, drillstring, and interior based on the well data;
   (c) a graphics processor for creating a two-dimensional visual rendering of the model;
   (d) a user input device for allowing user selection of a location within the three-dimensional model corresponding to a position along said borehole;
   (e) a graphics display for displaying a two-dimensional visual rendering of a segment of said three-dimensional model, the segment including said selected location, wherein the displayed rendering is generated in response to a user input through the user input device.

11. The visualization system of claim 10, wherein said user input device further allows for user navigation along a visual rendering of said borehole.

12. The visualization system of claim 11, wherein said user input device further allows for user selection of an orientation of said visual rendering.

13. The visualization system of claim 10, further comprising: a data processor for processing said well and drillstring data to compute fluid velocity at a selected location in said borehole, said graphics processor generating a velocity profile comprising a visual indication of fluid velocity in said borehole at said selected location.

14. The visualization system of claim 10, wherein said visual rendering comprises a texture-mapped wire mesh model of said borehole and drillstring.

15. The visualization system of claim 11, wherein said user input device comprises a keyboard.

16. The visualization system of claim 11, wherein said user input device comprises a joystick.

17. A computer-based method of visualizing a wellbore, comprising:
   (a) providing well data comprising a plurality of data sets each corresponding to a depth-varying parameter of a well comprising a borehole wherein at least one of the data sets corresponds to an interior of the borehole;
   (b) creating a three-dimensional model of said borehole and interior based on said well data;
   (c) selecting a location within the three-dimensional model corresponding to a position along said borehole; and
   (d) displaying a two-dimensional visual rendering of a segment of the three-dimensional model, the segment including the selected location.

18. The method of claim 17, wherein said step (c) of selecting a location comprises using a computer user input device to navigate along a visual rendering of said borehole.

19. The method of claim 18, further comprising selecting an orientation of said visual rendering using said user input device.

20. The method of claim 17, wherein said visual rendering comprises a texture-mapped wire mesh model of said borehole.

21. The visualization system of claim 10 wherein the processor programmed to create a three-dimensional model of the borehole, drillstring, and interior based on the well data and the graphics processor for creating a two-dimensional visual rendering of the model are the same processor.

22. The visualization system of claim 13 wherein the processor programmed to create a three-dimensional model of the borehole, drillstring, and interior based on the well data, the graphics processor for creating a two-dimensional visual rendering of the model, and the data processor for processing said well and drillstring data to compute fluid velocity at a selected location in said borehole are the same processor.

23. The visualization system of claim 13 wherein the processor programmed to create a three-dimensional model of the borehole, drillstring, and interior based on the well data and the data processor for processing said well and drillstring data to compute fluid velocity at a selected location in said borehole are the same processor.

* * * * *

UNITED STATES PATENT AND TRADEMARK OFFICE
CERTIFICATE OF CORRECTION

PATENT NO. : 7,603,264 B2
APPLICATION NO. : 11/083122
DATED : October 13, 2009
INVENTOR(S) : Zamora et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 529 days.

Signed and Sealed this

Fifth Day of October, 2010

David J. Kappos
*Director of the United States Patent and Trademark Office*